(12) United States Patent
Baek

(10) Patent No.: US 7,589,805 B2
(45) Date of Patent: *Sep. 15, 2009

(54) TRANSFLECTIVE LIQUID CRYSTAL DISPLAY AND METHOD OF FABRICATING THE SAME

(75) Inventor: Heum-Il Baek, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/136,415

(22) Filed: May 25, 2005

(65) Prior Publication Data

US 2005/0213006 A1    Sep. 29, 2005

Related U.S. Application Data

(62) Division of application No. 10/694,217, filed on Oct. 28, 2003, now Pat. No. 6,917,404, which is a division of application No. 09/850,186, filed on May 8, 2001, now Pat. No. 6,657,689.

(30) Foreign Application Priority Data

May 8, 2000   (KR) ............................ 2000-24471

(51) Int. Cl.
G02F 1/1335    (2006.01)

(52) U.S. Cl. ...................... 349/114; 349/102; 349/119

(58) Field of Classification Search ......... 349/113–114, 349/117–119, 96–103
See application file for complete search history.

(56) References Cited

U.S. PATENT DOCUMENTS

| | | | |
|---|---|---|---|
| 6,295,109 B1 | 9/2001 | Kubo et al. | 349/119 |
| 6,611,306 B2 * | 8/2003 | Baek | 349/117 |
| 6,657,689 B2 * | 12/2003 | Baek | 349/114 |
| 6,917,404 B2 * | 7/2005 | Baek | 349/114 |

FOREIGN PATENT DOCUMENTS

KR    1999-0036909    5/1999

* cited by examiner

*Primary Examiner*—Dung T. Nguyen
(74) *Attorney, Agent, or Firm*—Morgan Lewis & Bockius LLP

(57) ABSTRACT

The invention relates to a transflective liquid crystal display device that has a high contrast ratio. The transflective liquid crystal panel includes a homogeneous liquid crystal such that the transflective liquid crystal display device will have an optical retardation when the voltage is applied. Therefore, in order to compensate the optical retardation caused by this liquid crystal, a thickness of the liquid crystal layer is adjusted. Moreover, a thickness of the retardation film is also adjusted. Accordingly, the complete dark state and the high contrast ratio are achieved in the liquid crystal display.

3 Claims, 7 Drawing Sheets

TRANSFLECTIVE LIQUID CRYSTAL DISPLAY AND METHOD OF FABRICATING THE SAME

This application is a Divisional of U.S. patent application Ser. No. 10/694,217, filed on Oct. 28, 2003 now U.S. Pat. No. 6,917,404 and which is a Divisional of U.S. patent application Ser. No. 09/850,186 (now U.S. Pat. No. 6,657,689) filed on May 8, 2001 and claims the benefit of the Korean Application No. 2000-24471, filed May 8, 2000, all of which are hereby incorporated by reference in their entirety.

BACKGROUND OF THE INVENTION

1. Field of the Invention

The present invention relates to a liquid crystal display, and more particularly, to a transflective liquid crystal display and method of fabricating the same. Although the present invention is suitable for a wide scope of applications, it is particularly suitable for a high contrast ratio.

2. Discussion of the Related Art

In general, a liquid crystal display (LCD) is classified as a transmission type and a reflection type depending on implementing an internal or external light source. The transmission type has a liquid crystal display panel, which does not emit light itself, and has a backlight as a light-illuminating section.

The backlight is disposed at the rear or one side of the panel. The amount of the light from the backlight that passes through the liquid crystal panel is controlled by the liquid crystal panel in order to implement an image display. In other words, the light from the backlight varies and displays images according to the arrangement of the liquid crystal molecules. However, the backlight of the transmission type LCD consumes 50% or more of the total power consumed by the LCD device. Providing a backlight therefore increases power consumption.

In order to overcome the above problem, a reflection type LCD has been selected for portable information apparatuses that are often used outdoors or carried with users. Such a reflection type LCD is provided with a reflector formed on one of a pair of substrates. Thus, ambient light is reflected from the surface of the reflector. The reflection type LCD using the reflection of ambient light is disadvantageous in that a visibility of the display is extremely poor when surrounding environment is dark.

In order to overcome the above problems, a construction which realizes both a transmissive mode display and a reflective mode display in one liquid crystal display device has been proposed. This is so called a transflective liquid crystal display device. The transflective liquid crystal display (LCD) device alternatively acts as a transmissive LCD device and a reflective LCD device. Due to the fact that a transflective LCD device can make use of both internal and external light sources, it can be operated in bright ambient light as well as has a low power consumption.

FIG. 1 shows a typical transflective liquid crystal display (LCD) device 11. The transflective LCD device 11 includes upper and lower substrates 15 and 21 with an interposed liquid crystal 23. The upper and lower substrates 15 and 21 are sometimes respectively referred to as a color filter substrate and an array substrate.

On the surface facing into the lower substrate 21, the upper substrate 15 includes a black matrix 16 and a color filter layer 17. The color filter layer 17 includes a matrix array of red (R), green (G), and blue (B) color filters that are formed, such that each color filter is divided by the black matrix 16. The upper substrate 15 also includes a common electrode 13 over the color filter layer 17 and the black matrix 16.

On the surface facing into the upper substrate 15, the lower substrate 21 includes an array of thin film transistors (designated as TFT "T" in FIG. 1) that act as switching devices. The array of thin film transistors is formed to correspond to the matrix of color filters. A plurality of gate and data lines 25 and 27 are positioned and crossed over each other. A TFT is located near at each crossing portion of the gate and data lines 25 and 27. The lower substrate 21 also includes a plurality of pixel electrodes 19 in the area between the gate and data lines 25 and 27. Such an area is often referred to as pixel regions "P", as shown in FIG. 1.

Each pixel electrode 19 includes a transparent portion 19a and a reflective portion 19b. The transparent portion 19a is usually formed of a transparent conductive material having good light transmissivity, such as indium tin oxide (ITO). Alternatively, the transparent portion 19a may be a hole. Moreover, a conductive metallic material having a superior light reflectivity is used for the reflective portion 19b.

FIG. 2, a schematic cross-sectional view of a transflective LCD device 57 illustrating an operation of such devices. For convenience, the color filters 17 (shown in FIG. 1) are not shown in FIG. 2 because it does not affect the polarization state of light. As shown in FIG. 2, the transflective LCD device 57 includes lower and upper substrates 21 and 15 and an liquid crystal layer 23 having optical anisotropy is interposed therebetween.

The upper substrate 15 includes a common electrode 13 on its surface facing into the lower substrate 21. On the other surface of the upper substrate 15, an upper quarter wave plate (QWP) 45 (often referred to as a retardation film), which has a phase difference $\lambda/4$, and an upper polarizer 55 are formed in series.

The lower substrate 21 includes a transparent electrode 50 on its surface facing into the upper substrate 15. A passivation layer 48 and a reflective electrode 19b are formed in series on the transparent electrode 50. The reflective electrode 19b and the transparent electrode 50 act together as a pixel electrode (the reference numeral 19 of FIG. 1). The passivation layer 48 and the reflective electrode 19b also have a transmitting hole 19a.

Various configurations and structures may be implemented for the pixel electrode in the transflective LCD device. However, the passivation layer 48 should be formed between the transparent electrode 50 and the reflective electrode 19b.

In order to form a pixel electrode, a transparent conductive material such as ITO (indium tin oxide) or IZO (indium zinc oxide) is deposited on the lower substrate 21 and then patterned into the transparent electrode 50.

Next, the passivation layer 48 is formed on the transparent electrode 50. The conductive metallic material having superior reflectivity, such as aluminum (Al) or the like, is deposited on the passivation layer 48 and then patterned to form a reflective electrode 19b. In this patterning process, the transmitting hole 19a as a transparent portion is formed at the central portion of the reflective electrode 19b. Moreover the central portion of the passivation layer 48 corresponding to the hole 19a is also patterned to expose the central portion of the transparent electrode 50.

Accordingly, the transparent electrode 50 and the reflective electrode 19b serve as a pixel electrode. Moreover, this structure makes different cell gaps "$d_1$" and "$d_2$" between the common electrode 13 and the pixel electrode (the reflective electrode 19b and the transparent electrode 50). "$d_1$" denotes the first cell gap between the common electrode 13 and the reflective electrode 19b while "$d_2$" denotes the second cell gap between the common electrode 13 and the transparent electrode 50.

On the other surface of the lower substrate 21, a lower quarter wave plate 54 and a lower polarizer 52 are formed in series. Moreover, a backlight device 41 is arranged below the lower polarizer 52.

In a homogeneous liquid crystal or twisted nematic (TN), its molecules are oriented in the vertical direction when a voltage is applied ($V_{on}$=5V) and used as a liquid crystal layer 23. When an optical retardation "$\Delta n \cdot d_1$" of a first cell gap is $\lambda/4$ ($\lambda$=550 nm) and a second cell gap "$d_2$" is twice as large as the first cell gap "$d_1$" as described by equations (1) and (2), an optical retardation "$\Delta n \cdot d_2$" of the second cell gap "$d_2$" is shown in equation (3).

$$\Delta n \cdot d_1 = \lambda/4 \qquad (1)$$

$$d_2 \cong 2d_1 \qquad (2)$$

$$\therefore \Delta n \cdot d_2 \cong \lambda/2 \qquad (3)$$

In the above equations, $\Delta n$ is birefringence, $d_1$ denotes the first cell gap between the reflective electrode and the common electrode, $d_2$ denotes the second cell gap between the transparent electrode and the common electrode. $\lambda$ is the wavelength of the light, and $\lambda/4$ is a phase shift value of the light when the light passes through a reflective portion of the liquid crystal layer 23 between the common electrode 13 and the reflective electrode 19b at once. $\lambda/2$ is a phase shift value of the light when the light passes through a transparent portion of the liquid crystal layer between the common electrode 13 and the transparent electrode 50 at once.

Accordingly, the optical retardation "$\Delta n \cdot d_2$" of the second cell gap "$d_2$", as shown by equation (3), is $\lambda/2$ ($\lambda$=550 nm). In the reflective mode, the ambient light passes through the liquid crystal layer 23 twice, i.e., as the ambient light is reflected by the reflective electrode 19b.

As mentioned above, since different cell gaps (the transparent portion and the reflective portion) are formed in the liquid crystal layer 23, there is no difference in the optical retardation of light passing both through the transparent portion and through the reflective portion.

FIG. 3 shows a liquid crystal orientation in cases that the voltage is applied and not applied. As shown, molecules of the liquid crystal layer 23 are arranged in the horizontal direction along the upper and lower substrates 13 and 21 when the voltage is not applied. On the other hand, the molecules are arranged in the vertical direction perpendicular to the upper and lower substrates 13 and 21 when the voltage is applied. However, in the ON-state, the molecules close to the upper and lower substrate 13 and 21 are not oriented properly because of an anchoring energy generated between the liquid crystal molecules and each substrate.

Therefore, the liquid crystal layer 23 derives characteristics of birefringence because the liquid crystal molecules are not properly oriented. Namely, a residual optical phase retardation can exist because of unchanged orientation or alignment of some of the liquid crystal molecules that are close to the upper and lower substrates 13 and 21. These cause the light leakage in a dark state of the LCD device.

In general, in case of the TN liquid crystal that has a twisted angle of 90°, molecules detached from the upper and lower substrates are mostly arranged perpendicular to the pair of substrates when the voltage is applied since these molecules are not affected from the anchoring energy. Moreover, the molecules close to the pair of substrates are not arranged in the vertical direction. Thus, the orientation direction of the TN liquid crystal molecules close to the upper substrate are arranged perpendicular to that of the molecules close to the lower substrate. As a result, an optical effect of the TN liquid crystal is offset each other.

However, in case of the homogeneous liquid crystal that has a twisted angle of 0° as shown in FIG. 3, these molecules close to the upper and lower substrates 13 and 21 affect the optical effect of the liquid crystal layer 23. This is because an orientation direction of the molecules located close to the upper substrate 13 are parallel to that of the molecules around the lower substrate 23.

Therefore, a light leakage occurs in the dark state of the LCD device when the upper retardation film (the reference numeral 45 of FIG. 2) and the lower retardation film (the reference numeral 54 of FIG. 2) have the same phase difference value. In addition, a contrast ratio of the transflective LCD device is deteriorated by the light leakage.

FIG. 4 is a simplified cross-sectional view in order to calculate a phase retardation value of the above-mentioned homogeneous liquid crystal. As shown, the upper polarizer 55 and the lower polarizer 52 are facing into each other. The liquid crystal layer 23 that has the optical retardation $\lambda/2$ is interposed between the pair of polarizers 55 and 52. Thereafter, a transmittance is measured by a simulator such as an LCD master.

FIG. 5 is a graph illustrating a transmittance when a voltage is applied to the transflective LCD device of FIG. 4. When the voltage is applied, i.e., the TFT is turned ON, the transmittance should be ideally zero (i.e., T=0). However, the transmittance results in 0.038 (i.e., T=0.038) in experiment. Moreover, the transmittance can be calculated by the following equation (4).

$$T = \mathrm{Sin}^2 2\phi \mathrm{Sin}^2 \left[ \frac{\pi \cdot \Delta n \cdot d}{\lambda} \right] \qquad (4)$$

In equation (4), "T" denotes a transmittance, "$\Delta n \cdot d$" denotes an optical retardation, $\lambda$ denotes a wavelength of light, $\phi$ denotes an angle between a tranmissive axis of the polarizer and an optical axis of the liquid crystal layer. From the above equation (4), the optical retardation "$\Delta n \cdot d$" is 34 nm (i.e., $\Delta n \cdot d$=34 nm), when $\lambda$ is 550 nm and $\phi$ is 45 degrees.

Accordingly, the light passing through the liquid crystal layer, which includes a homogeneous liquid crystal, has an optical retardation when a voltage is applied to the related art transflective LCD device. Thus, a complete dark state can not be achieved because of the light leakage described above.

SUMMARY OF THE INVENTION

Accordingly, the present invention is directed to a transflective liquid crystal display and a method of fabricating the same that substantially obviate one or more of the problems due to limitations and disadvantages of the related art.

An object of the invention is to provide a transflective LCD display and a method of fabricating the same achieving a high contrast ratio.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective liquid crystal display includes upper and lower substrates facing into and spaced apart from each other, wherein the upper and lower substrates include a plurality of pixel regions that display images, a liquid crystal layer interposed between the upper and lower substrates, wherein the liquid crystal layer has a first adjusted thickness to compensate an residual optical retardation of incident light caused by anchored liquid crystals near an alignment layer when a maximum operation voltage is applied, an upper quarter wave plate (QWP) on the upper substrate, wherein the upper quarter wave plate has a second adjusted thickness to compensate the residual optical retardation caused by the liquid crystal layer when the maximum operation voltage is applied, an upper polarizer on the upper quarter wave plate, a transparent common electrode on a surface of the upper substrate facing into the lower substrate, a pixel electrode over a first surface of the lower substrate, wherein the pixel electrode corresponds to each pixel region, and the pixel electrode is divided into transparent and reflective portions, a lower quarter wave plate (QWP) on a second surface of the lower substrate, a lower polarizer below the lower quarter wave plate, and a backlight device arranged to be adjacent to the lower polarizer.

The liquid crystal layer has a thickness of "d" and a transmittance of "T" when a maximu voltage for operating is applied, wherein an adjusted thickness of liquid crystal layer is calculated using the following equation:

$$T = \mathrm{Sin}^2 2\phi \mathrm{Sin}^2 \left[ \frac{\pi \cdot \Delta n \cdot d_1}{\lambda} \right],$$

where, T is equals to the value of the transmittance, $\phi$ is an angle between an optical axis of the liquid crystal layer and a transmissive axis of the polarizer, $\Delta n$ is a birefringence of the liquid crystal layer, and wherein $d_1$ is calculated from the above equation, and the liquid crystal layer then has the adjusted thickness "d+$d_1$" for compensating the optical retardation. A value of $\phi$ mentioned above is 45 degrees.

The upper QWP has a thickness of "d" and a transmittance of "T", wherein an adjusted thickness of the upper QWP for compensation is calculated using the following equation:

$$T = \mathrm{Sin}^2 2\phi \mathrm{Sin}^2 \left[ \frac{\pi \cdot \Delta n \cdot d_2}{\lambda} \right],$$

where, T is equals to the value of the transmittance, $\phi$ is an angle between a slow axis of the upper QWP and a transmissive axis of the polarizer, $\Delta n$ is a birefringence of the upper QWP, and wherein $d_2$ is calculated from the above equation and the upper QWP then has the adjusted thickness "d+$d_2$" for compensating the optical retardation. A value of $\phi$ mentioned above is 45 degrees. In accordance with the purpose of the invention, in another aspect, the principles of the present invention provide a transflective liquid crystal display device, including: upper and lower substrates facing and spaced apart from each other, wherein the upper and lower substrates include a plurality of pixel region that display images; a liquid crystal layer interposed between the upper and lower substrates, wherein the liquid crystal layer has an adjusted thickness of compensating a residual optical retardation of incident light caused by anchored liquid crystals near an alignment layer when a maximum voltage for operating is applied; a first upper retardation film over the upper substrate; a second upper retardation film between the first upper retardation film and the upper substrate, wherein the second upper retardation film has an adjusted thickness of compensating an optical retardation caused by the liquid crystal layer; an upper polarizer on the first upper retardation film; a transparent common electrode on a surface of the upper substrate facing the lower substrate; a transparent electrode on a surface of the lower substrate facing the upper substrate; a pixel electrode over the lower substrate, wherein the pixel electrode corresponds to each pixel region, and wherein the pixel electrode is divided into transparent and reflective portions; a second lower retardation film on the other surface of the lower substrate, wherein the second lower retardation film has an adjusted thickness of compensating a residual optical retardation caused by the liquid crystal layer when a maximum voltage for operating is applied; a first lower retardation film under the second lower retardation film; a lower polarizer under the first lower retardation film; and a backlight device arranged adjacent to the lower polarizer.

The transparent portion of the pixel electrode includes a transparent electrode, and wherein the transparent electrode is disposed on a surface of the lower substrate facing the upper substrate. The transflective liquid crystal display device further comprises a passivation layer on the transparent electrode, the passivation layer having a transmitting hole in its central portion. Moreover, the reflective portion of the pixel electrode includes a reflective electrode, which is disposed on the passivation layer and has the transmitting hole in its central portion.

The transflective liquid crystal display device further includes a passivation layer on the transparent electrode, and the passivation layer has a transmitting hole in its central portion. Moreover, the transflective liquid crystal display device further includes a reflective electrode on the passivation layer, and the reflective electrode has the transmitting hole in its central portion.

The liquid crystal layer has a thickness of "d" in a reflective portion in order for an optical retardation of $\lambda/4$, and a thickness of "2d" in a transmissive portion in order ofr an optical retardation of $\lambda/2$, wherein the liquid crystal layer has a transmittance of "T" when a maximum voltage for operating is applied, wherein an adjusted thickness of the liquid crystal layer is calculated using the following equation:

$$T = \mathrm{Sin}^2 2\phi \mathrm{Sin}^2 \left[ \frac{\pi \cdot \Delta n \cdot d_*}{\lambda} \right],$$

where, T is equals to the value of the transmittance, $\phi$ is an angle between an optical axis of the liquid crystal layer and a transmissive axis of the polarizer, $\Delta n$ is a birefringence of the liquid crystal layer, and $d^*$ is a thickness of the liquid crystal layer, wherein $d^*$ is $d_1$ or $d_2$, wherein $d_1$ and $d_2$ are calculated from the above equation, where, $d_1$ is a first auxiliary thickness of the liquid crystal layer when the residual optical retardation of the light is $\gamma$ in the reflective portion, $d_2$ is a second auxiliary thickness of the liquid crystal layer when the residual optical retardation of the light is $\omega$ in the transmissive portion, and then the phase difference between the transmissive and reflective portions is $\delta = \omega - \gamma$, and wherein the reflective portion of the liquid crystal layer has the adjusted thickness of "d+$d_1$" and the transmissive portion of the liquid crystal display has the adjusted thickness of "2d+d$_2$" for compensating the optical retardation. A value of φ mentioned above is 45 degrees.

The second upper retardation film has a thickness of "d$_4$" and a transmittance of "T", wherein an adjusted thickness of the second retardation film is calculated using the following equation:

$$T = \text{Sin}^2 2\phi \text{Sin}^2 \left[ \frac{\pi \cdot \Delta n \cdot d_*}{\lambda} \right],$$

where, T is equals to the value of the transmittance, φ is an angle between a slow axis of the retardation film and a transmissive axis of the polarizer, Δn is a birefringence of the retardation film, and d* is a thickness of the liquid crystal layer, wherein d* is d$_1$, d$_2$ or d$_3$, wherein d$_1$, d$_2$ and d$_3$ are calculated from the above equation and the following equation:

$$d_{2(\omega)} = d_{1(\gamma)} + d_{3(\delta)},$$

where, d$_1$ is a first auxiliary thickness of the liquid crystal layer when the residual optical retardaion of the light is γ in the reflective portion, d$_2$ is a second auxiliary thickness of the liquid crystal layer when the residual optical retardaion of the light is ω in the transmissive portion, and then the phase difference between the transmissive and reflective portions is δ=ω−γ, and wherein the second upper retardation film has the thickness of "d$_4$+d$_{1(\gamma)}$" for compensating the optical retardation. A value of φ mentioned above is 45 degrees.

The second lower retardation film has the thickness of "d$_4$−d$_{3(\delta)}$" for compensating the optical retardation. The first upper and lower retardation films are beneficially half wave plates (HWPs) and the second upper and lower retardation films are beneficially quarter wave plates (QWPs). The transmissive axis of the lower polarizer is perpendicular to that of the upper polarizer. The slow axis of the first upper retardation film is perpendicular to that of the first lower retardation film. The slow axis of the second upper retardation film is perpendicular to that of the second lower retardation film. The optical axis of the liquid crystal layer is parallel with the slow axis of the second lower retardation film.

In another aspect of the present invention, a transflective liquid crystal display device includes upper and lower substrates facing and spaced apart from each other, wherein the upper and lower substrates include a plurality of pixel region that display images; an upper quarter wave plate (QWP) on the upper substrate; an upper polarizer on the upper quarter wave plate; a lower quarter wave plate (QWP) under the lower substrate; a lower polarizer under the lower quarter wave plate; a backlight device arranged adjacent to the lower polarizer; a liquid crystal layer interposed between the upper and lower substrates; a transparent common electrode on a surface of the upper substrate facing the lower substrate; an upper alignment layer between the transparent common electrode and the liquid crystal layer; a pixel electrode over the lower substrate, wherein the pixel electrode corresponds to each pixel region, and wherein the pixel electrode is divided into transmissive and reflective portions; and a lower alignment layer between the pixel electrode and the liquid crystal layer; wherein a transmissive axis of the upper polarizer is perpendicular to a transmissive axis of the lower polarizer; wherein a slow axis of the upper QWP is perpendicular to a slow axis of the lower QWP; wherein the slow axis of the upper QWP forms an angle of 45° with the transmissive axis of the upper polarizer; wherein an optical retardation of the upper QWP is λ/4+α; wherein a ranges from zero to 100 nm; and wherein the slow axis of the lower QWP is parallel with an orientation direction of the liquid crystal display layer.

An optical retardation of the liquid crystal layer is λ/4+α. The optical retardation of the liquid crystal layer is different between transmissive and reflective portions, wherein the optical retardation is λ/4+α in the reflective portion, and wherein the optical retardation is λ/2+β in the transmissive portion, and wherein β ranges from zero to 100 nm. Here, an optimum value of α for adjusting the optical retardation ranges from zero to 50 nm and an optimum value of β for adjusting the optical retardation ranges from zero 50 nm.

In another aspect of the present invention, a transflective liquid crystal display includes upper and lower substrates facing and spaced apart from each other, wherein the upper and lower substrates include a plurality of pixel region that display images; an upper quarter wave plate (QWP) on the upper substrate; an upper half wave plate (HWP) on the upper QWP; an upper polarizer on the upper HWP; a lower quarter wave plate (QWP) under the lower substrate; a lower half wave plate (HWP) under the lower QWP; a lower polarizer under the lower HWP; a backlight device arranged adjacent to the lower polarizer; a liquid crystal layer interposed between the upper and lower substrates; a transparent common electrode on a surface of the upper substrate facing the lower substrate; an upper alignment layer between the transparent common electrode and the liquid crystal layer; a pixel electrode over the lower substrate, wherein the pixel electrode corresponds to each pixel region, and wherein the pixel electrode is divided into transparent and reflective portions; and a lower alignment layer between the pixel electrode and the liquid crystal layer; wherein a transmissive axis of the upper polarizer is perpendicular to a transmissive axis of the lower polarizer; wherein a slow axis of the upper QWP is perpendicular to a slow axis of the lower QWP; wherein a slow axis of the upper HWP is perpendicular to a slow axis of the lower HWP; wherein an optical retardation of the upper QWP is λ/4+α; wherein a ranges from zero to 100 nm; wherein the slow axis of the lower QWP is parallel with an orientation direction of the liquid crystal display layer; wherein an optical retardation of the lower QWP is λ/4−β; and wherein β ranges from zero to 100 nm.

An optical retardation of the liquid crystal layer is different between transmissive and reflective portions, wherein the optical retardation is λ/4+α in the reflective portion, and wherein the optical retardation is λ/2+α+β in the transmissive portion. An optimum value of α ranges from zero to 50 nm for adjusting the optical retardation and an optimum value of β ranges from zero to 50 nm for adjusting the optical retardation.

The slow axis of the upper HWP forms an angle of θ with the transmissive axis of the upper polarizer. The slow axis of the upper QWP forms an angle of 2θ+45° with the transmissive axis of the upper polarizer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
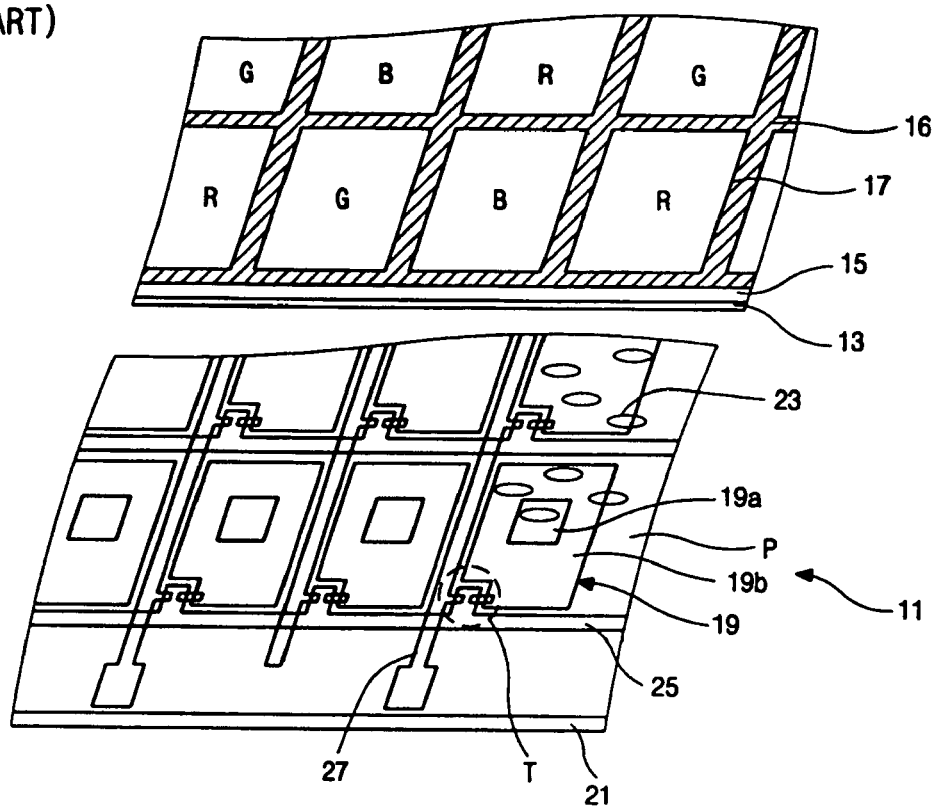
FIG. 1 shows a typical transflective liquid crystal display (LCD) device.
Figure 2:
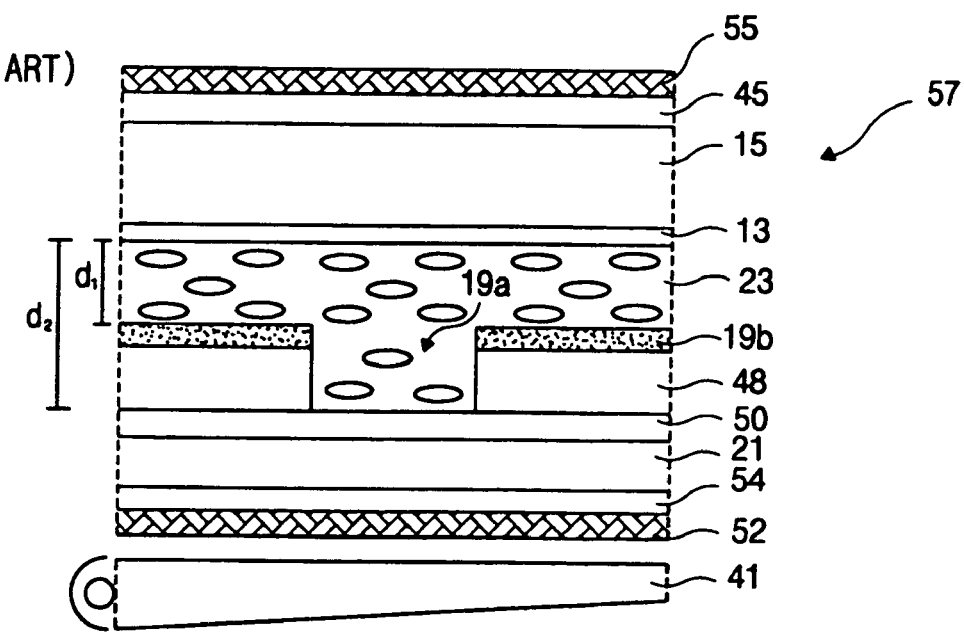
FIG. 2 shows a schematic cross-sectional view of a transflective LCD device illustrating an operation of such devices.
Figure 6:
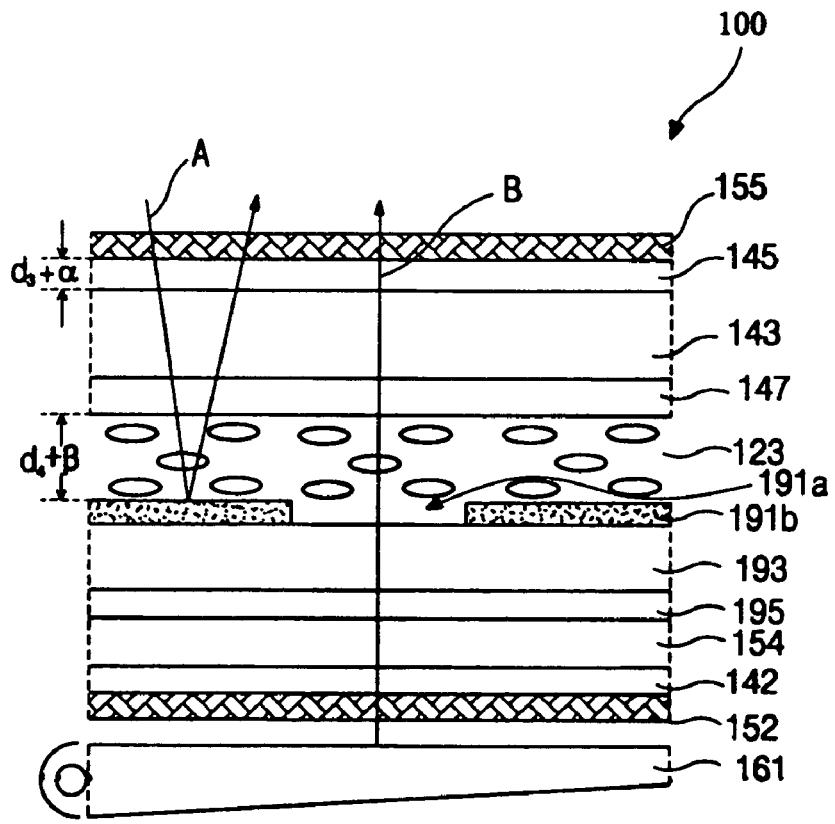
FIG. 6 is a schematic cross-sectional view of a transflective LCD device illustrating an operation of such devices according to a first embodiment of the present invention.

FIG. 6, a schematic cross-sectional view of a transflective LCD device 100 illustrating an operation of such devices according to a first embodiment of the present invention. For convenience, the color filters (the reference numeral 17 of FIG. 1) are not shown in FIG. 6 because they do not affect the polarization state of light. Also, some of explanation will be omitted if not necessary.

As shown in FIG. 6, the transflective LCD device 100 includes upper and lower substrates 143 and 154 and an interposed liquid crystal layer 123 that has an optical retardation of λ/4. A common electrode 147 is formed on the upper substrate 143. On the other surface of the upper substrate 143, an upper quarter wave plate (QWP) 145 (often referred to as an upper retardation film), which has a phase difference λ/4, and an upper polarizer 155 are successively formed thereon.

A transparent electrode 195 is formed on the lower substrate 154. A passivation layer 193 and a reflective electrode 191b are successively formed on the transparent electrode 195. The reflective electrode 191b and the transparent electrode 195 act together as a pixel electrode. On the other surface of the lower substrate 154, a lower quarter wave plate (QWP) 142 (referred to as a lower retardation film) and a lower polarizer 152 are successively formed thereon. Moreover, a backlight device 161 is arranged to be adjacent to the lower polarizer 152.

Figure 3:
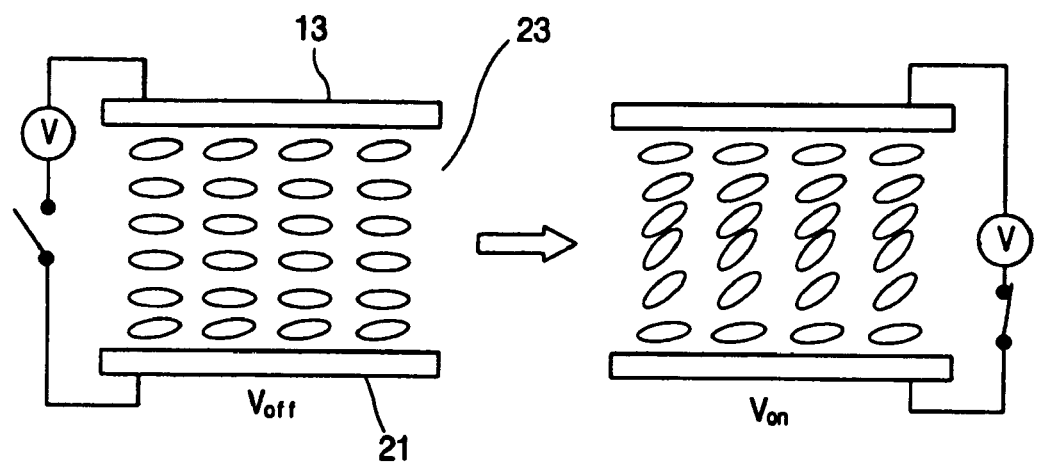
FIG. 3 is a schematic view illustrating a liquid crystal orientation when a voltage is applied or not applied to the crystal.
Figure 4:
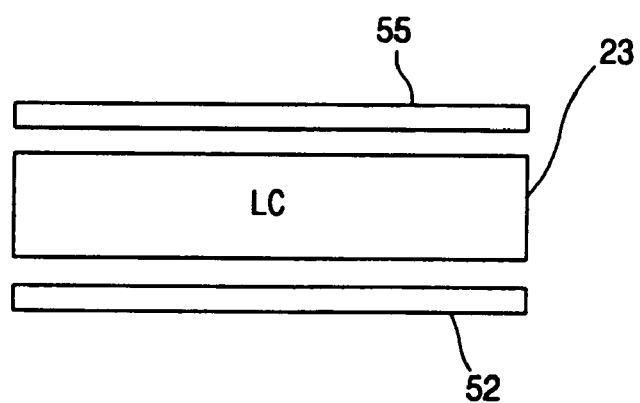
FIG. 4 is a simplified cross-sectional view in order to calculate a phase retardation value of the homogeneous liquid crystal.

In the first embodiment, the liquid crystal layer 123 includes a homogeneous liquid crystal. Therefore, the liquid crystal molecules, as aforementioned, are vertically arranged when the voltage is applied, and thus the transflective LCD device displays the dark state. However, the molecules close to the pair of substrates, as described in FIG. 3, are not arranged to be perpendicular to the substrates. This causes the liquid crystal layer to have an optical retardation value. As a result, the light passing through the liquid crystal layer has the optical retardation so that some portion of the light leaks from the panel due to a wavelength dispersion.

Referring back to FIG. 5, the transmittance of the light passing through the liquid crystal layer is measured (i.e., T=0.038) when the voltage is applied. Then the optical retardation "Δn·d" is calculated using equation (4). The optical retardation of the liquid crystal can be compensated by adjusting a thickness of the liquid crystal layer.

Figure 5:
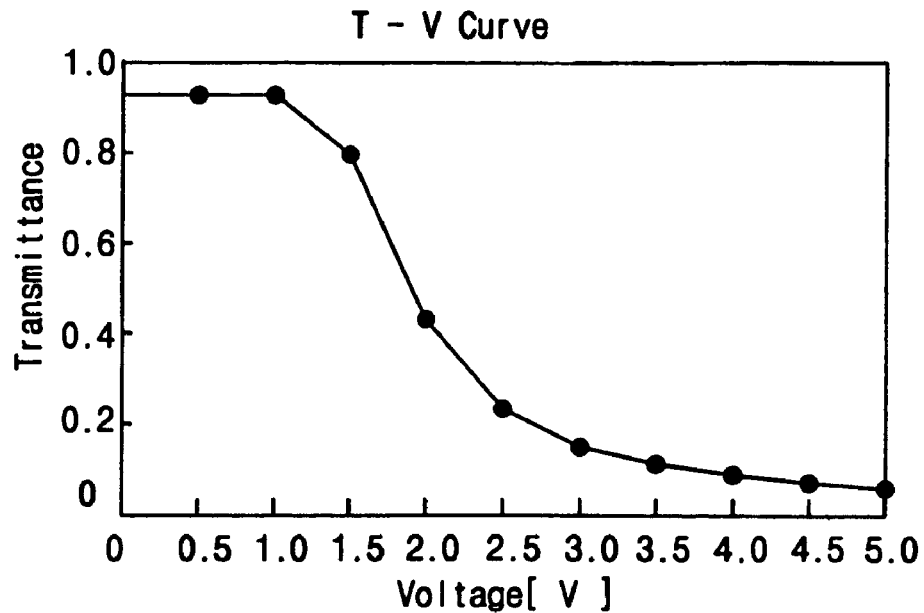
FIG. 5 is a graph illustrating a transmittance when a voltage is applied to the transflective LCD device of FIG. 4 in the related art LCD device.

Referring to FIG. 6, for instance, suppose that the optical retardation value of the upper retardation film is 140 nm (at Δn=0.0028, d=50 micrometers). Further, suppose that the liquid crystal layer is ZGS-5063 (Δn=0.067), which is conventionally used. If a voltage is applied to the liquid crystal layer, an optical retardation value of the light passing through the liquid crystal layer should be ideally zero. However, due to the molecules arranged close to the substrates, the light passing through the liquid crystal has a non-zero optical retardation. Thus, when the transmittance is 0.038 (T=0.038) as shown in FIG. 5, the liquid crystal layer has the optical retardation of 34 nm (Δn·d=34 nm) using equation (4).

From the equation of Δn·d=34 nm, "d" of the retardation film is about 12 micrometers (i.e., d=12 micrometers) when the birefringence "Δn" is 0.0028. Thus, the retardation film is thicker by 12 micrometers (i.e., α=12 micrometers) than it could be (i.e., $d_3+\alpha$, shown in FIG. 6). Moreover, "d" of the liquid crystal layer is about 0.5 micrometers (i.e., d=0.5 micrometers) from the equation of Δn·d=34 nm when Δn=0.067. Thus, the liquid crystal layer is thicker by 0.5 micrometers (i.e., β=0.5 micrometers) than it could be (i.e., $d_4+\beta$, shown in FIG. 6).

Each thickness of the liquid crystal layer and the retardation film may be described by the following TABLE 1.

TABLE 1

|  |  | Reflective | Transmissive |
|---|---|---|---|
| $V_{off}$ | Upper retardation film | λ/4 + Δn · d | λ/4 + Δn · d |
|  | Liquid crystal layer | λ/4 + Δn · d | λ/2 + Δn · d |
|  | Lower retardation film | Don't care | λ/4 |
| $V_{on}$ | Upper retardation film | λ/4 + Δn · d | λ/4 + Δn · d |
|  | Liquid crystal layer | Δn · d | Δn · d |
|  | Lower retardation film | Don't care | λ/4 |

Accordingly, as shown in TABLE 1, the transflective LCD device in the present invention can have a completely polarized light in the reflective and transmissive modes by controlling the thickness of the liquid crystal layer 123 and of the upper retardation film 145.

When a voltage is not applied to the liquid crystal layer 123, the light passing through the reflective portion of the liquid crystal layer 123 has an optical retardation of λ/2. On the other hand, the light passing through the transmissive portion of the liquid crystal layer 123 has the optical retardation of λ/2. Conversely, when a voltage is applied to the liquid crystal layer 123, both the light passing through the reflective and the transmissive portions of the liquid crystal layer 123 has a zero optical retardation.

Accordingly, the complete dark state of the transflective LCD device can be achieved in both transmissive and reflective modes. Although the optical retardation is λ/2 in the liquid crystal layer when a voltage is not applied, the optical retardation of λ/4 is acceptable for simplifying the fabrication process step.

Figure 7:
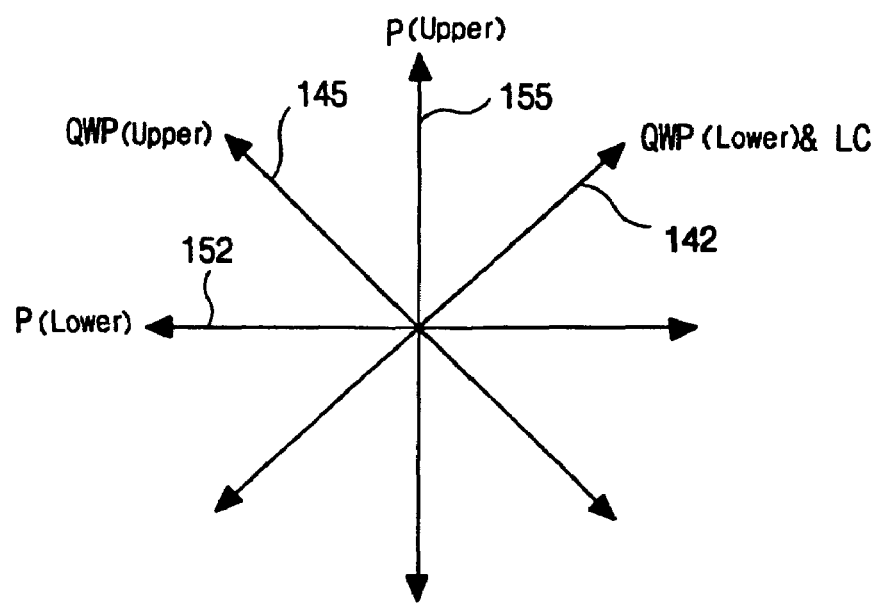
FIG. 7 shows a positional relationship among elements of the transflective LCD device shown in FIG. 6.

In addition to the method of adjusting the thickness of the liquid crystal layer and of the retardation film, the transflective LCD device may be designed by using other ways. For example, a slow axis of the upper QWP 145 is designed to be perpendicular to that of the lower QWP 142. Alternatively, the slow axis of the lower QWP 142 is parallel with an orientation direction of the liquid crystal layer, as shown in FIG. 7. Moreover, a transmissive axis of the upper polarizer 155 is perpendicular to that of the lower polarizer 152. Therefore, the residual optical retardation of the liquid crystal layer in the voltage of on-state is offset by these perpendicular structures. A light leakage is thus prevented when the transflective LCD device displays the dark state.

Figure 8A:
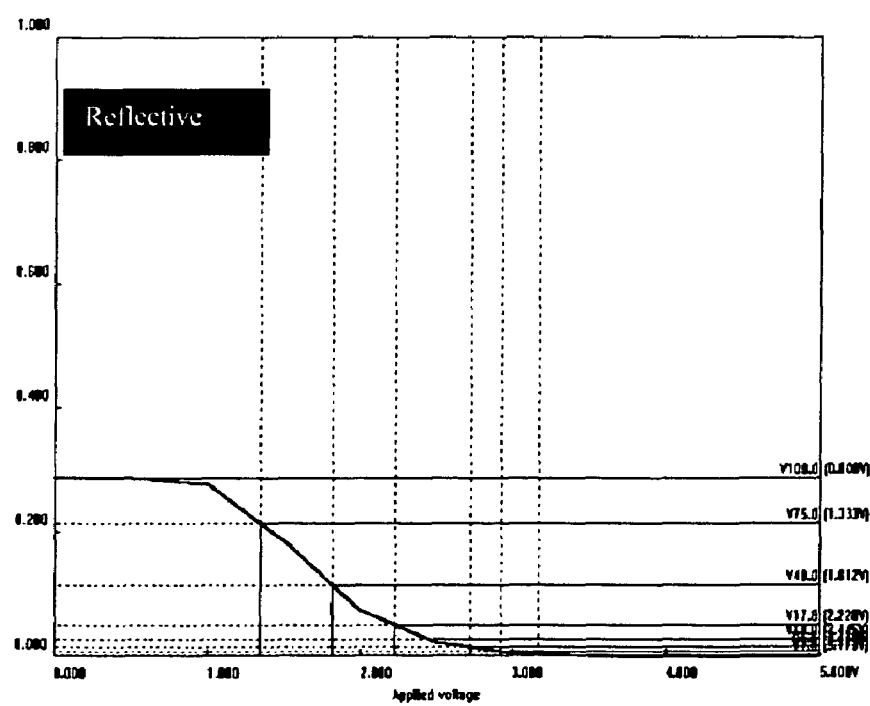
FIGS. 8A and 8B are graphs illustrating a reflectance in the reflective portion and a transmittance in the transmissive portion of the transflective LCD device, respectively.
Figure 8B:
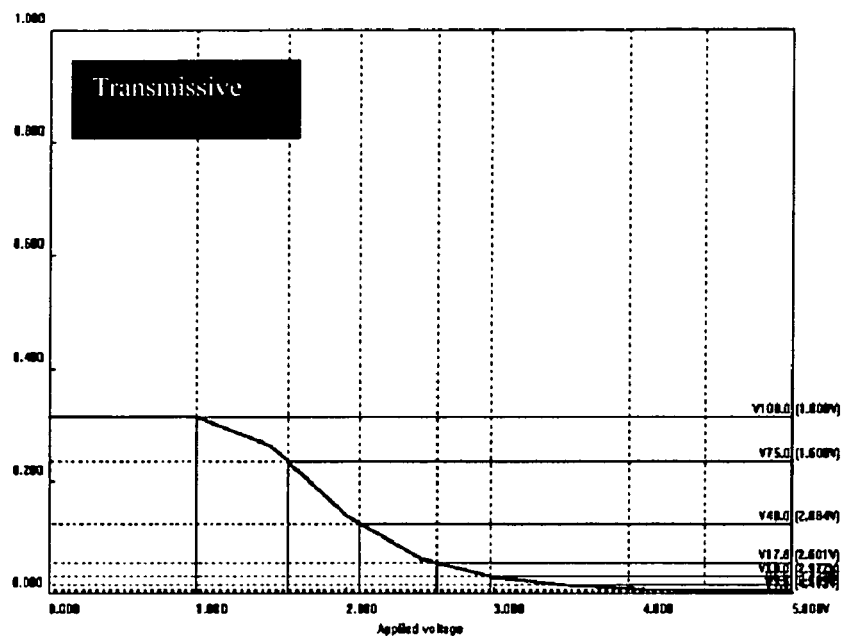

FIGS. 8A and 8B are graphs illustrating reflectance in the reflective portion and transmittance in the transmissive portion of the transflective LCD device, respectively. As shown, when a voltage is applied ($V_{on}$=5V), a light leakage does not occur in both the reflective and transmissive portions of the transflective LCD device. On the other hand, when a voltage is not applied ($V_{off}$=0V), both the reflectance and the transmittance are about 0.3. These are almost equal to each other.

A contrast ratio is relatively more affected by the brightness of the LCD device in the dark state. According to the present invention, since the complete dark state can be achieved when a voltage is applied, the transflective LCD device has a high contrast ratio.

A second embodiment of the present invention will be explained hereinafter referring to accompanying drawings. In the second embodiment, thickness of both the upper and lower retardation films is adjusted for compensating an optical retardation of the transmissive and reflective portions. The thickness of the liquid crystal layer is also adjusted.

Figure 9:
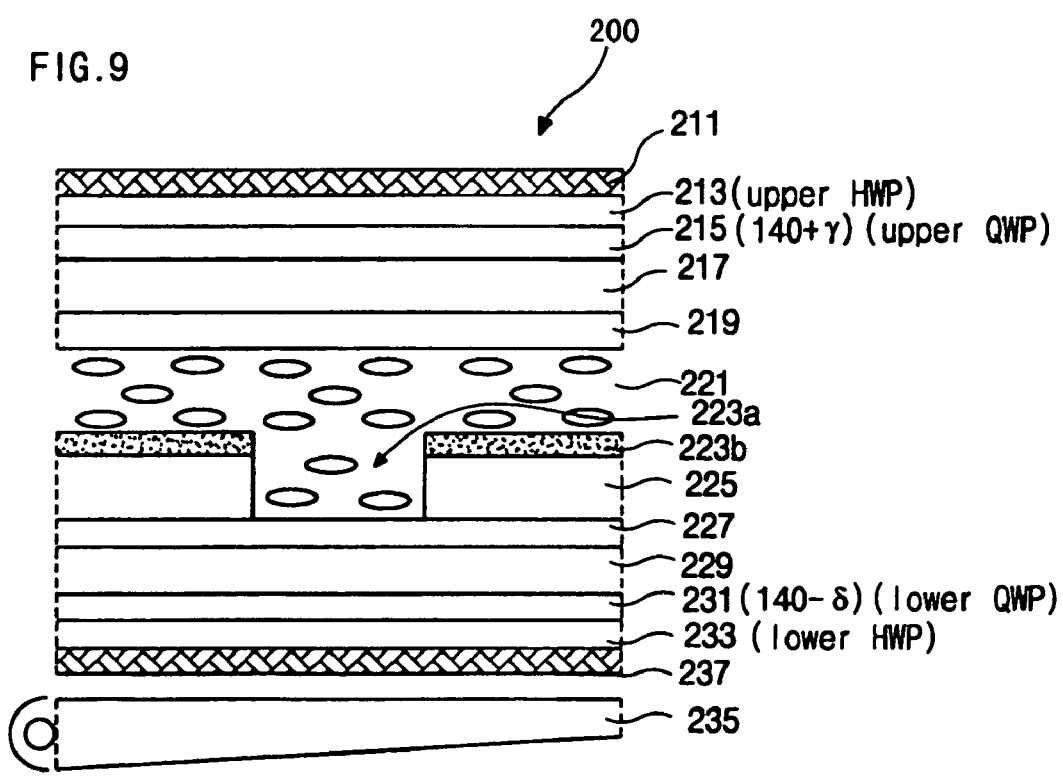
FIG. 9 is a schematic cross-sectional view of the transflective LCD device according to a second embodiment.

FIG. 9 is a schematic cross-sectional view of a transflective LCD device according to the second embodiment. For convenience, the color filters (the reference numeral 17 of FIG. 1) are not shown in FIG. 9 because they do not affect the polarization state of light.

As shown in FIG. 9, the transflective LCD device 200 includes upper and lower substrates 217 and 229 and an interposed liquid crystal layer 221. The upper substrate 217 includes a common electrode 219 on the surface facing into the lower substrate 229. On the other surface of the upper substrate 217, an upper quarter wave plate (QWP) 215, an upper half wave plate (HWP) 213, and an upper polarizer 211 are successively formed thereon. The upper HWP 213 has an optical retardation of 270 nm (λ/2; at λ=550 nm) and the upper QWP 215 has an optical retardation of 140 nm (λ/4; at λ=550 nm). The upper HWP 213 and the upper QWP 215 act as first and second upper retardation films, respectively.

Still referring to FIG. 9, the lower substrate 229 includes a transparent electrode 227 on the surface facing into the upper substrate 217. A passivation layer 225 and a reflective electrode 223b are successively formed on the transparent electrode 227. A transmitting hole 223a penetrating both the reflective electrode 223b and the passivation layer 225 is formed in the central part of both the reflective electrode 223b and the passivation layer 225. The reflective electrode 223b and the transparent electrode 227 act together as a pixel electrode.

On the other surface of the lower substrate 229, a lower quarter wave plate (QWP) 231, a lower half wave plate (HWP) 233, and a lower polarizer 237 are successively formed thereon. The lower QWP 231 has an optical retardation of 140 nm (λ/4; at λ=550 nm) and the lower HWP 233 has an optical retardation of 270 nm (λ/2; at λ=550 nm). The lower HWP 233 and the lower QWP 231 act as first and second lower retardation films, respectively. The lower polarizer 237 has a transmissive axis that is perpendicular to a transmissive axis of the upper polarizer 211. Moreover, a backlight device 235 is arranged adjacent to the lower polarizer 237.

Figure 10:
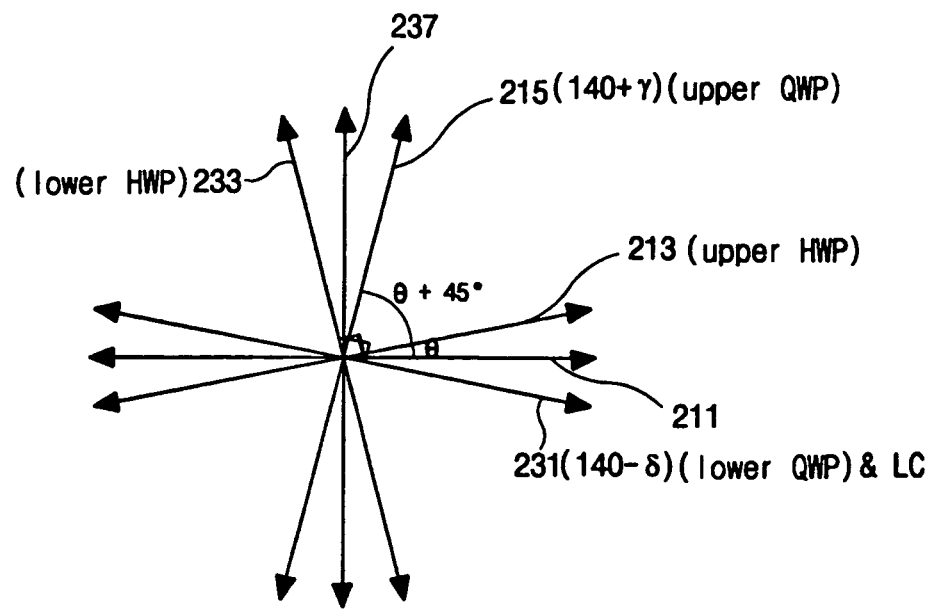
FIG. 10 shows a positional relationship of the elements of the transflective LCD device shown in FIG. 9.

FIG. 10 shows a positional relationship of the transflective LCD device of FIG. 9 according to the second embodiment. As shown in FIG. 10, the transmissive axis of the upper polarizer 211 is perpendicular to that of the lower polarizer 237. A slow axis of the upper HWP 213 is perpendicular to that of the lower HWP 233 while a slow axis of the upper QWP 215 is perpendicular to that of the lower QWP 231. Moreover, an orientation direction of the liquid crystal layer is parallel to the slow axis of the lower QWP 231. The optical axes of the lower part elements is perpendicular to those of their mutual upper part elements, resulting in that optical compensation effect of the light passing aforementioned transflective LCD device is achieved with high efficiency.

The reason of forming two retardation films (QWP and HWP) on each substrate is to expand an optical compensation effect through the broad-wavelength band of the light. In other words, the slow axis of the quarter wave plate should be disposed at an angle of 45° from the transmissive axis of the polarizer in order to convert the linearly polarized light to the circularly polarized light. By achieving the angle of 45° between the transmissive axis of the polarizer and the slow axis of the retardation film, the linearly polarized light that has passed through the polarizer is converted into the circularly polarized light by the phase difference of λ/4.

Moreover, the optical retardation of an object is depending on the wavelengths of the incident light, and a general retardation film is designed focusing on the wavelength of 550 nm that is the central portion of the visible light (380 nm to 780 nm). Thus, the optical retardation of the general retardation film is λ/4, (i.e., 140 nm). Therefore, the retardation film does not properly serve to produce the circularly polarized light in the other wavelengths, resulting in the elliptically polarized light. In order to solve this problem, two retardation films are used in both upper substrate and lower substrate. This structure shown in FIG. 10 enables to control all wavelengths of the visible light in accordance with the angle "θ".

An operating principle of the above-mentioned transflective LCD device will be explained hereinafter.

As incident light passes through the polarizer, the light is converted into the linearly polarized light. When the linearly polarized light faces the retardation film having an optical retardation of 270 nm, a direction of the linearly polarized light is changed by the optical axis of the retardation film. However, the retardation film act as a half wave plate (λ/2) for a designed wavelength such as λ=550 nm, so that the retardation film produces the elliptically polarized light in the other wavelengths.

Thereafter, the light results in having an angle of 45° from the slow axis of the QWP such that the linearly polarized light is converted into the circularly polarized light. Before the light enters the QWP, the HWP compensates the light for its optical retardation, and thus all wavelengths of the linearly polarized light are nearly converted into the circularly polarized light.

However, the compensation effect of the retardation film as discussed above has some limitations as follows.

First of all, since a homogeneous liquid crystal is not completely arranged in the vertical direction when a voltage is applied, a phase difference caused in the liquid crystal layer is not completely compensated. In addition, since there is a phase difference in the different cell gaps, (i.e., reflective portion and transmissive portion), it is difficult to precisely compensate the phase differences caused in the reflective and transmissive portions at the same time.

Accordingly, in order to compensate the phase differences caused both in the reflective and transmissive potions, not only the thickness of the liquid crystal layer but also the thickness of the upper and lower QWPs are adjusted at the same time. Thus, the phase of the light is compensated accordingly. In other words, a phase value occurring in the different cell gaps of the liquid crystal layer is greater in the transmissive portion than in the reflective portion.

At this point, suppose that a phase difference of the reflective portion is γ and a phase difference of the transmissive portion is ω. If the phase difference δ between the transmissive and reflective porions is ω−γ (i.e., δ=ω−γ), then the phase difference of the transmissive portion is ω=δ+γ. Therefore, the cell gaps of the transmissive and reflective portions is written as following equations:

$$d_{(\lambda/4)}+d_{(\gamma)} \quad (5): \text{cell gap of reflective portion}$$

$$d_{(\lambda/2)}+d_{(\omega=\delta+\gamma)} \quad (6): \text{cell gap of transmissive portion}$$

Here, an orientation direction of the liquid crystal layer has an angle of 90° from the slow axis of the upper QWP and an angle of 0° from the slow axis of the lower QWP. Thus, an offset occurs between the liquid crystal layer and the upper retardation film, while reinforcement occurs between the liquid crystal layer and the lower retardation film. Here, analysis of the state of polarization will be in terms of a form according to the Jones matrix method, in which two components, of the electric field, perpendicular to a direction of movement of light are expressed as a vector, and the transmission medium is expressed as a 2×2 matrix:

$$\begin{pmatrix} e^{i\varepsilon_x} & 0 \\ 0 & e^{i\varepsilon_y} \end{pmatrix} \quad (6)$$

wherein $\varepsilon_x$ and $\varepsilon_y$ denote optical retardations of x-axis and of y-axis, respectively, in orthogonal coordinates system. Here, the proper optical retardation is represented by $\Delta\varepsilon=\varepsilon_y-\varepsilon_x$. Therefore, if the slow axis of the upper QWP (140 nm) is perpendicular to the optical axis of the liquid crystal layer, the slow axis of the upper QWP is the x-axis and the orientation direction is the y-axis. $\Delta\varepsilon$ of the upper QWP becomes a negative value (∵$\varepsilon_y<\varepsilon_x$), and $\Delta\varepsilon$ of the liquid crystal layer becomes a positive value (∵$\varepsilon_y>\varepsilon_x$), and then the optical retardation $\Delta\varepsilon$ is offset by each other.

However, since the optical axis of the liquid crystal layer is parallel to the slow axis of the lower QWP, the optical axis of the liquid crystal layer and the slow axis of the lower QWP can altogether either be x-axis or y-axis in orthogonal coordinates system. Therefore, the optical retardation $\Delta\varepsilon$ of both the liquid crystal layer and the lower QWP has either positive or negative value, and then the optical retardation $\Delta\varepsilon$ is reinforced.

From the equations (5) and (6), the thickness of the upper and lower QWP is adjusted, resulting in that the optical retardation of the upper QWP is 140 nm+γ and the optical retardation of the lower QWP is 140 nm−γ. Thus, the optical retardation is offset by each other.

The thickness of the liquid crystal layer and of the retardation films can be described by the following TABLE 2.

TABLE 2

|   |   |   | Reflective | Transmissive |
|---|---|---|---|---|
| $V_{off}$ | Upper retardation films | HWP | 270 nm | 270 nm |
|   |   | QWP | 140 nm + γ | 140 nm + γ |
|   | Liquid crystal layer |   | 140 nm + γ | 270 nm + γ + δ |
|   | Lower retardation films | QWP | Don't care | 140 nm − δ |
|   |   | HWP |   | 270 nm |
| $V_{on}$ | Upper retardation films | HWP | 270 nm | 270 nm |
|   |   | QWP | 140 nm + γ | 140 nm + γ |
|   | Liquid crystal layer |   | γ | γ + δ |
|   | Lower retardation films | QWP | Don't care | 140 nm − δ |
|   |   | HWP |   | 270 nm |

For more detailed explanation, as shown in TABLE 2 and FIGS. 9 and 10, the state of complete polarization of the light can be achieved by adjusting the thickness of both the liquid crystal layer 221 and the upper and lower QWPs 215 and 231. When a voltage is not applied, the part of optical retardation (γ) caused by the liquid crystal layer 221 in the reflective portion is offset by the upper QWP 215. The, part of optical retardation (γ+δ) caused by the liquid crystal layer 221 in the transmissive portion is also offset by both the upper and lower QWPs 215 and 231. Thus, every components of the light passing through both the reflective and transmissive portions has the optical retardation of λ/2 (at λ=550 nm).

On the other hand, when the voltage is applied, the optical retardation (γ) caused by the liquid crystal layer 221 in the reflective portion is offset by the upper QWP 215, and thus the light passing through the reflective portion has the optical retardation of zero. Moreover, the optical retardation (γ+δ) caused by the liquid crystal layer 221 in the transmissive portion is also offset by both the upper and lower QWPs 215 and 231, and thus the light passing through the transmissive portion has the optical retardation of zero. Accordingly, the dark state of the transflective LCD device can be achieved in both transmissive mode and reflective mode as described before.

Figure 11A:
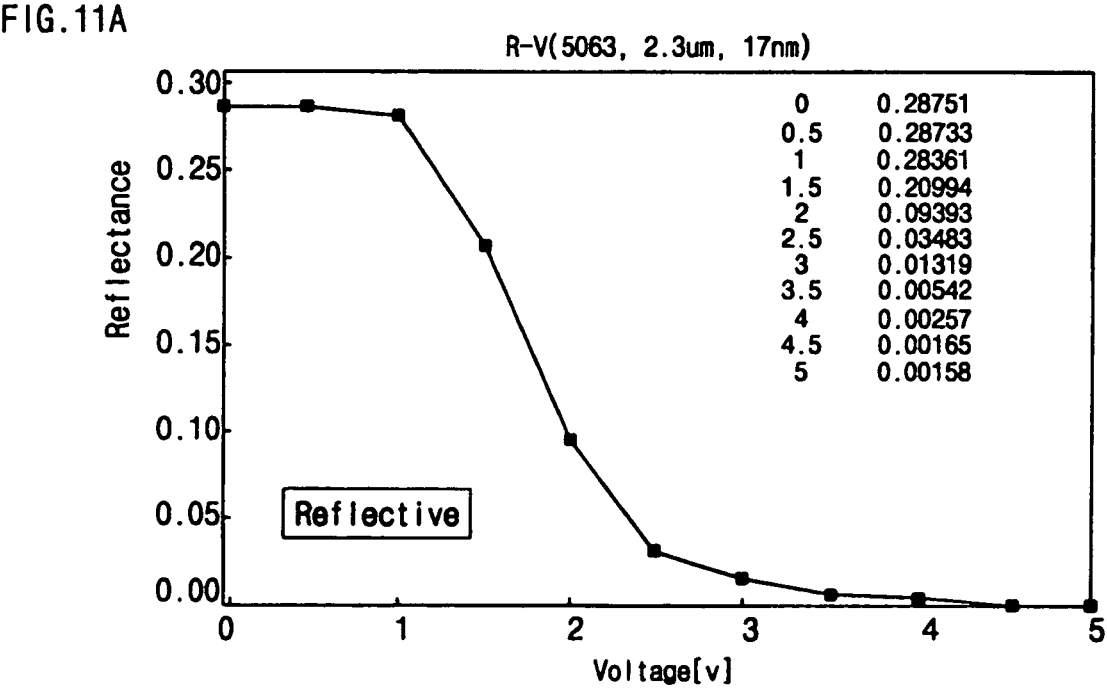
FIGS. 11A and 11B are graphs respectively illustrating reflectance and transmittance with variations in applied voltages according to the second embodiment.
Figure 11B:
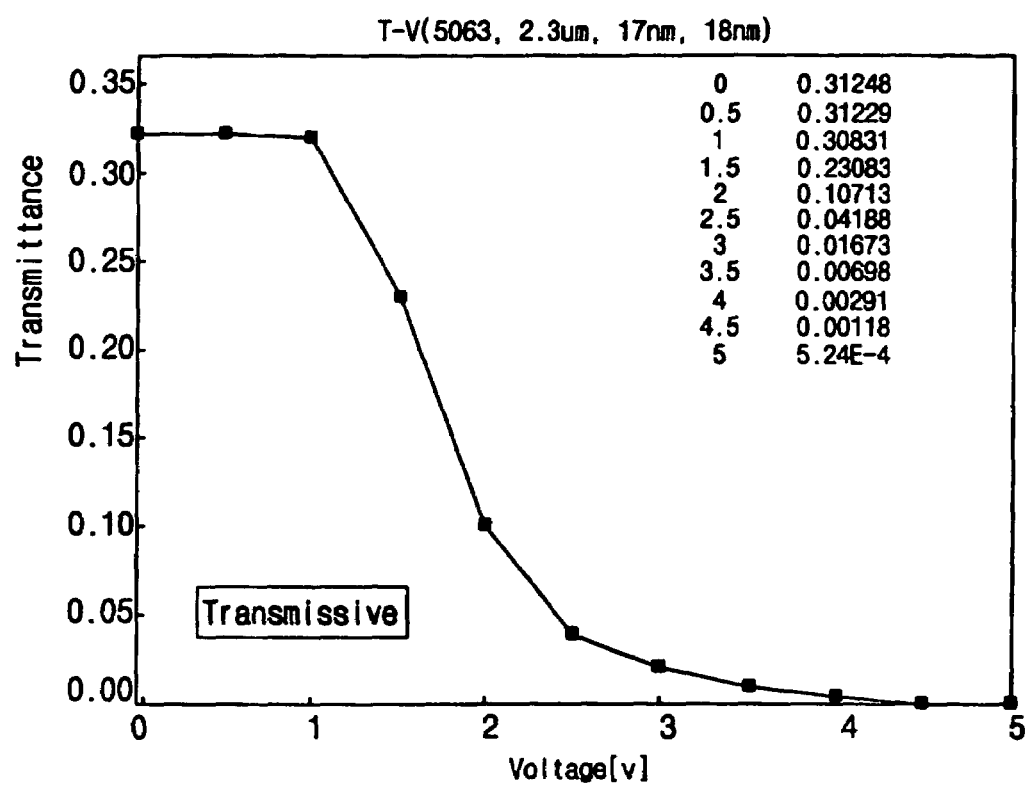

After fabricating the LCD panel that has above-mentioned structure, the transmittance is measured by a simulator such as an LCD master. The results are shown in FIGS. 11A and 11B. At this time, the liquid crystal layer is ZGS-5063 (Δn=0.067) that is conventionally used. A thickness of the liquid crystal layer is 2.3 micrometers. A phase difference of the reflective portion is γ=17 nm. A phase difference of the transmissive portion is ω=34.8 nm. Thus, the phase difference in between the reflective and transmissive portions is δ☐18 nm from the above-mentioned equation ω=γ+δ.

FIGS. 11A and 11B are graphs illustrating the reflectance and the transmittance, respectively, depending on the applied voltage.

Referring to FIG. 11A that shows the reflectance in the reflective mode, because of the compensation effect of both the upper QWP and the liquid crystal layer, the reflectance is about 0.27 when the voltage is not applied (i.e., $V_{off}$=0V). However, when the voltage is applied (i.e., $V_{on}$=5V), the reflectance is zero. Thus, the light is not reflected completely when the TFT is turned ON.

Referring to FIG. 11B that shows the transmittance in the transmissive mode, because of the compensation effect of the upper and lower QWPs and of the liquid crystal layer, the transmittance is about 0.32 when the voltage is not applied (i.e., $V_{off}$=0V). When the voltage is applied (i.e., $V_{on}$=5V), the transmittance is zero.

Therefore, the complete dark state of the LCD device can be achieved in both tansmissive and reflective modes when the voltage is applied. From these results, the high contrast ratio can be achieved in the transflective LCD device.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A transflective liquid crystal display, comprising:
upper and lower substrates facing into and spaced apart from each other, wherein the upper and lower substrates include a plurality of pixel regions that display images;
an upper quarter wave plate (QWP) on the upper substrate;
an upper polarizer on the upper quarter wave plate;
a lower quarter wave plate (QWP) below the lower substrate;
a lower polarizer below the lower quarter wave plate;
a backlight device arranged to be adjacent to the lower polarizer;
a liquid crystal layer interposed between the upper and lower substrates;
a transparent common electrode on a surface of the upper substrate facing into the lower substrate;
an upper alignment layer between the transparent common electrode and the liquid crystal layer;
a pixel electrode over the lower substrate, wherein the pixel electrode corresponds to each pixel region, and the pixel electrode is divided into transparent and reflective portions; and
a lower alignment layer between the pixel electrode and the liquid crystal layer;
wherein a transmissive axis of the upper polarizer is perpendicular to a transmissive axis of the lower polarizer, a slow axis of the upper QWP is perpendicular to a slow axis of the lower QWP, the slow axis of the upper QWP forms an angle of 45° with the transmissive axis of the upper polarizer, an optical retardation of the upper QWP is $\lambda/4+\alpha$, and an optical retardation of the liquid crystal layer is $\lambda/4+\alpha$ in the reflective portion so that the upper QWP has the same optical retardation as the liquid crystal layer in the reflective portion, ranges from zero to 100 nm, and the slow axis of the lower QWP is parallel to an orientation direction of the liquid crystal display layer, and
wherein the liquid crystal layer has an adjusted thickness, and wherein the adjusted thickness is $d+d_1$, where d is a normal thickness of the liquid crystal layer and $d_1$ is calculated using the following equation, $$T = \mathrm{Sin}^2 2\phi \mathrm{Sin}^2 \left[ \frac{\pi \cdot \Delta n \cdot d_1}{\lambda} \right],$$

where T is a value of transmittance when a maximum operation voltage is applied, $\phi$ is an angle between an optical axis of the liquid crystal layer and a transmissive axis of the polarizer, $\Delta n$ is a birefringence of the liquid crystal layer.

2. The transflective liquid crystal display according to claim 1, wherein an optical retardation of the liquid crystal layer is different between transmissive and reflective portions, the optical retardation is $\lambda/2+\beta$ in the transmissive portion, and $\beta$ ranges from zero to 100 nm.

3. The transflective liquid crystal display according to claim 2, wherein an optimum value of $\beta$ for adjusting the optical retardation ranges from zero to 50 nm.

* * * * *